US011996755B2

(12) United States Patent
Dewolf et al.

(10) Patent No.: US 11,996,755 B2
(45) Date of Patent: May 28, 2024

(54) COMPRESSOR DEVICE

(71) Applicant: ATLAS COPCO AIRPOWER, NAAMLOZE VENNOOTSCHAP, Wilrijk (BE)

(72) Inventors: Hannes Dewolf, Wilrijk (BE); Luc Colman, Wilrijk (BE); Dries T'Jampens, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 241 days.

(21) Appl. No.: 17/628,408

(22) PCT Filed: Jul. 13, 2020

(86) PCT No.: PCT/IB2020/056562
§ 371 (c)(1),
(2) Date: Jan. 19, 2022

(87) PCT Pub. No.: WO2021/028741
PCT Pub. Date: Feb. 18, 2021

(65) Prior Publication Data
US 2022/0271610 A1 Aug. 25, 2022

(30) Foreign Application Priority Data
Aug. 12, 2019 (BE) .................................. 2019/5526

(51) Int. Cl.
*H02K 5/20* (2006.01)
*F04C 18/16* (2006.01)
(Continued)

(52) U.S. Cl.
CPC ............. *H02K 5/203* (2021.01); *F04C 18/16* (2013.01); *F04C 29/02* (2013.01); *F04C 29/045* (2013.01);
(Continued)

(58) Field of Classification Search
CPC ........ F04C 18/16; F04C 29/0007–0014; F04C 29/042–045; F04C 29/02; F04C 2240/40; H02K 5/203; H02K 9/19; H02K 11/25
See application file for complete search history.

(56) References Cited

U.S. PATENT DOCUMENTS 3,805,101 A * 4/1974 Purman .................... H02K 9/20 62/505
4,959,570 A * 9/1990 Nakamura ............... H02K 9/20 310/59

(Continued)

FOREIGN PATENT DOCUMENTS

CN 109519383 A * 3/2019 ............. F04C 23/02
CN 209385342 U * 9/2019 ............. F04C 23/02

(Continued)

OTHER PUBLICATIONS

Office Action dated May 1, 2023 in Japanese Application No. 2022-507821.

(Continued)

*Primary Examiner* — Alexander B Comley
(74) *Attorney, Agent, or Firm* — Sughrue Mion, PLLC

(57) ABSTRACT

Compressor device provided with:
a compressor element (2) with an inlet (5) for supplying gas and an outlet (6) for discharging compressed gas,
a magnet-assisted motor (3) provided with a motor housing (10) in which a motor stator (11) is installed and a motor rotor (12) is rotatably installed in the motor stator (11), wherein the motor stator (11) is provided with windings (13) and wherein the motor housing (10) is provided with or acts as a cooling jacket (17);
an oil supply line (18) for injecting oil into the magnet-assisted motor (3);
characterized in that the oil supply line (18) is connected with one or several nozzles (22) directed at heads or axial
(Continued)

Figure 1:
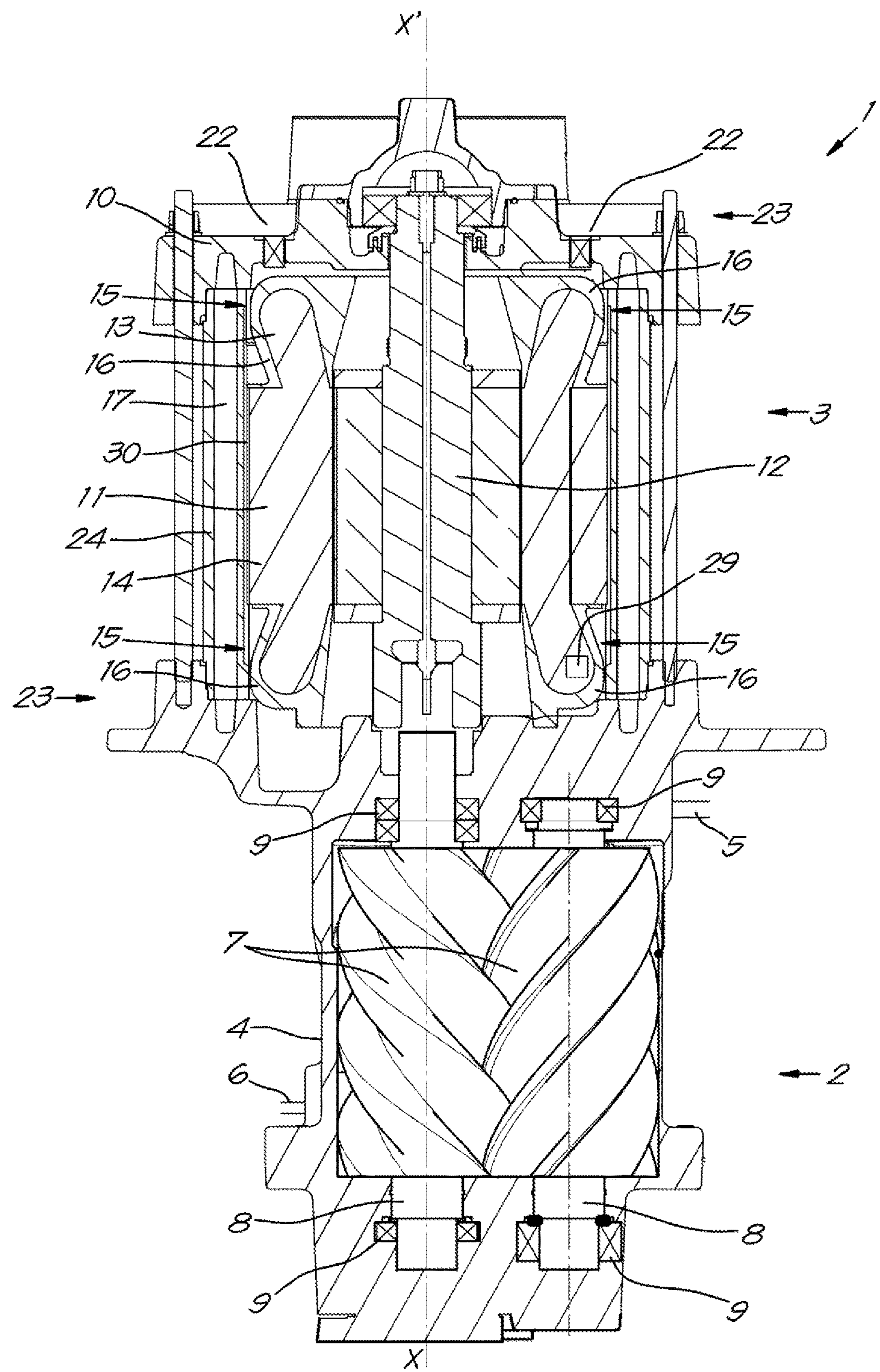

ends (15) of the windings (13) of the motor stator (11) and with the cooling jacket (17) of the magnet-assisted motor (3) and that heads or axial ends (15) of the windings (13) are covered with a protective layer (16).

14 Claims, 3 Drawing Sheets

(51) Int. Cl.
*F04C 29/02* (2006.01)
*F04C 29/04* (2006.01)
*H02K 9/19* (2006.01)
*H02K 11/25* (2016.01)

(52) U.S. Cl.
CPC ............... *H02K 9/19* (2013.01); *H02K 11/25* (2016.01); *F04C 2240/40* (2013.01); *F04C 2270/195* (2013.01)

(56) References Cited

U.S. PATENT DOCUMENTS

| | | | | |
|---|---|---|---|---|
| 5,682,074 | A * | 10/1997 | Di Pietro | H02K 15/0012 310/211 |
| 6,201,321 | B1 * | 3/2001 | Mosciatti | H02K 9/223 310/43 |
| 2004/0109771 | A1 * | 6/2004 | Ioi | F04C 29/0085 417/410.5 |
| 2005/0151431 | A1 * | 7/2005 | Cronin | H02K 5/203 310/58 |
| 2009/0277215 | A1 * | 11/2009 | Tsuboi | F04C 23/001 418/5 |
| 2011/0052432 | A1 * | 3/2011 | Cunningham | F04D 29/048 417/423.12 |
| 2015/0035391 | A1 * | 2/2015 | Fuchs | H02K 9/19 310/53 |
| 2018/0306189 | A1 * | 10/2018 | De Bontridder | F04C 2/102 |
| 2019/0063438 | A1 * | 2/2019 | Hamada | F04C 29/04 |

FOREIGN PATENT DOCUMENTS

| | | | | | |
|---|---|---|---|---|---|
| EP | 1 580 434 | A1 | | 9/2005 | |
| EP | 1580434 | A1 | * | 9/2005 | F04D 13/0633 |
| JP | 57 121869 | U | | 7/1982 | |
| JP | 64-16238 | A | | 1/1989 | |
| JP | 3-43596 | U | | 4/1991 | |
| JP | 2000097186 | A | * | 4/2000 | F04C 18/16 |
| JP | 3076609 | U | | 4/2001 | |
| JP | 2002168184 | A | * | 6/2002 | |
| JP | 2003-32979 | A | | 1/2003 | |
| JP | 2004-135398 | A | | 4/2004 | |
| JP | 2004-180479 | A | | 6/2004 | |
| JP | 2004-211568 | A | | 7/2004 | |
| JP | 2004-343857 | A | | 12/2004 | |
| JP | 2004343857 | A | * | 12/2004 | |
| JP | 2004350466 | A | * | 12/2004 | |
| JP | 2009118686 | A | * | 5/2009 | |
| JP | 2013-42588 | A | | 2/2013 | |
| JP | 2014110705 | A | * | 6/2014 | |
| JP | 2015-045290 | A | | 3/2015 | |
| JP | 2015-95961 | A | | 5/2015 | |
| JP | 2018-170941 | A | | 11/2018 | |
| JP | 2018170941 | A | * | 11/2018 | |
| JP | 2019-75854 | A | | 5/2019 | |
| JP | 2019-122075 | A | | 7/2019 | |
| WO | 2005/080814 | A1 | | 9/2005 | |
| WO | WO-2005080814 | A1 | * | 9/2005 | F16C 33/6651 |
| WO | 2018/083579 | A1 | | 5/2018 | |
| WO | WO-2018083579 | A1 | * | 5/2018 | F01C 21/02 |

OTHER PUBLICATIONS

Office Action dated Feb. 27, 2023 from the Japanese Patent Office in Application No. 2022-507821.

International Search Report for PCT/IB2020/056562 dated Aug. 20, 2020 (PCT/ISA/210).

Written Opinion for PCT/IB2020/056562 dated Aug. 20, 2020 (PCT/ISA/237).

* cited by examiner

COMPRESSOR DEVICE

CROSS REFERENCE TO RELATED APPLICATIONS

This application is a National Stage of International Application No. PCT/IB2020/056562 filed Jul. 13, 2020, claiming priority based on Belgian Patent Application No. 2019/5526 filed Aug. 12, 2019.

The present invention relates to a compressor device, comprising a magnet-assisted motor, for example a permanent magnet motor, to drive the compressor device.

More specifically, the invention is intended to ensure optimum cooling of the magnet-assisted motor.

It is known that the maximum power of a magnet-assisted motor is limited by the maximum temperature of the magnet-assisted motor, in particular the maximum temperature of the stator windings.

To ensure the proper operation of the magnet-assisted motor, the temperature in these windings must not rise too high.

By cooling the magnet-assisted motor, for example with a cooling medium such as oil, the maximum power of the magnet-assisted motor can be increased.

Typically, the magnet-assisted motor is equipped with cooling channels in the magnet-assisted motor housing or jacket through which a cooling medium may flow.

This means that the generated heat must reach the cooling medium through convection by the air in the stator and then by conduction through the magnet-assisted motor housing.

In other words, there is a thermal resistance between heat in the windings and in the cooling medium.

This means cooling of the stator windings is far from optimal, so in practice the maximum power of the magnet-assisted motor can only be increased to a limited degree.

This invention aims at solving at least one of the aforementioned and other disadvantages.

For this purpose, the invention relates to a compressor device equipped with:

- a compressor element with an inlet for supplying gas and an outlet for discharging compressed gas;
- a magnet-assisted motor provided with a motor housing including a motor stator and a motor rotor which is rotatably fitted in the motor stator, wherein the motor stator includes windings and wherein the motor housing is provided with or acts as a cooling jacket,
- an oil supply line to allow injecting of oil into the magnet-assisted motor, characterized in that the oil supply line is connected to one or more nozzles which are directed at heads or axial ends of the motor stator windings and with the magnet-assisted motor cooling jacket and that the heads or axial ends of the windings are provided with a protective layer.

An advantage is that by spraying the oil directly onto the heads or axial ends of the windings, also called 'winding heads', the winding heads can be cooled much more efficiently.

The oil will be able to dissipate heat much more effectively due to the lack of thermal resistance between the winding heads and the oil.

Because the winding heads are provided with a protective layer, they are protected from the oil being sprayed on them and, more importantly, from any condensate in the oil.

This will prevent any electrical problems caused by the condensate. Due to the forced cooling of the winding heads, the temperature will increase less quickly so the maximum motor power can be increased.

In a practical embodiment, the oil supply line branches out into two branch lines, with a first branch line connecting the oil supply line to said nozzles and the second branch line connecting the oil supply line to the cooling jacket.

By providing two branch lines, part of the oil can be routed to the cooling jacket to provide the known traditional motor cooling and another part to the nozzle or nozzles to provide the additional, forced cooling of the winding heads.

For example, general motor cooling can be provided that way, wherein the oil will cool the motor housing to dissipate heat from the motor, as a specific cooling directed at the winding heads, which are typically the motor hotspots.

In addition, a branched oil supply offers the possibility to adjust the flow rate and/or temperature of each supply according to requirements or necessity.

In an alternative embodiment, the oil supply line is directly connected to the cooling jacket wherein all the oil first goes to the cooling jacket and then to the nozzles.

When the oil has passed through the cooling jacket, the oil will then be guided to the nozzles and sprayed onto the winding heads in the motor.

For example, this may be realized by providing internal channels in the motor and/or motor housing.

Unlike in the case of said parallel oil flow with two branch lines, such a serial flow offers the advantage that forced integration can be realized.

Of course it is not ruled out that the oil is first guided to the nozzles to be injected onto the winding heads, and only then goes to the cooling jacket.

In an alternative embodiment, the motor stator is provided with axially oriented grooves or channels and/or axially oriented grooves or channels are provided in the housing at the location of the motor stator.

These grooves will allow the injected oil to flow along the motor stator and/or the housing while providing further cooling.

The injected oil can also flow away between the motor rotor and the motor stator or through laminations of the motor stator.

Figure 2:
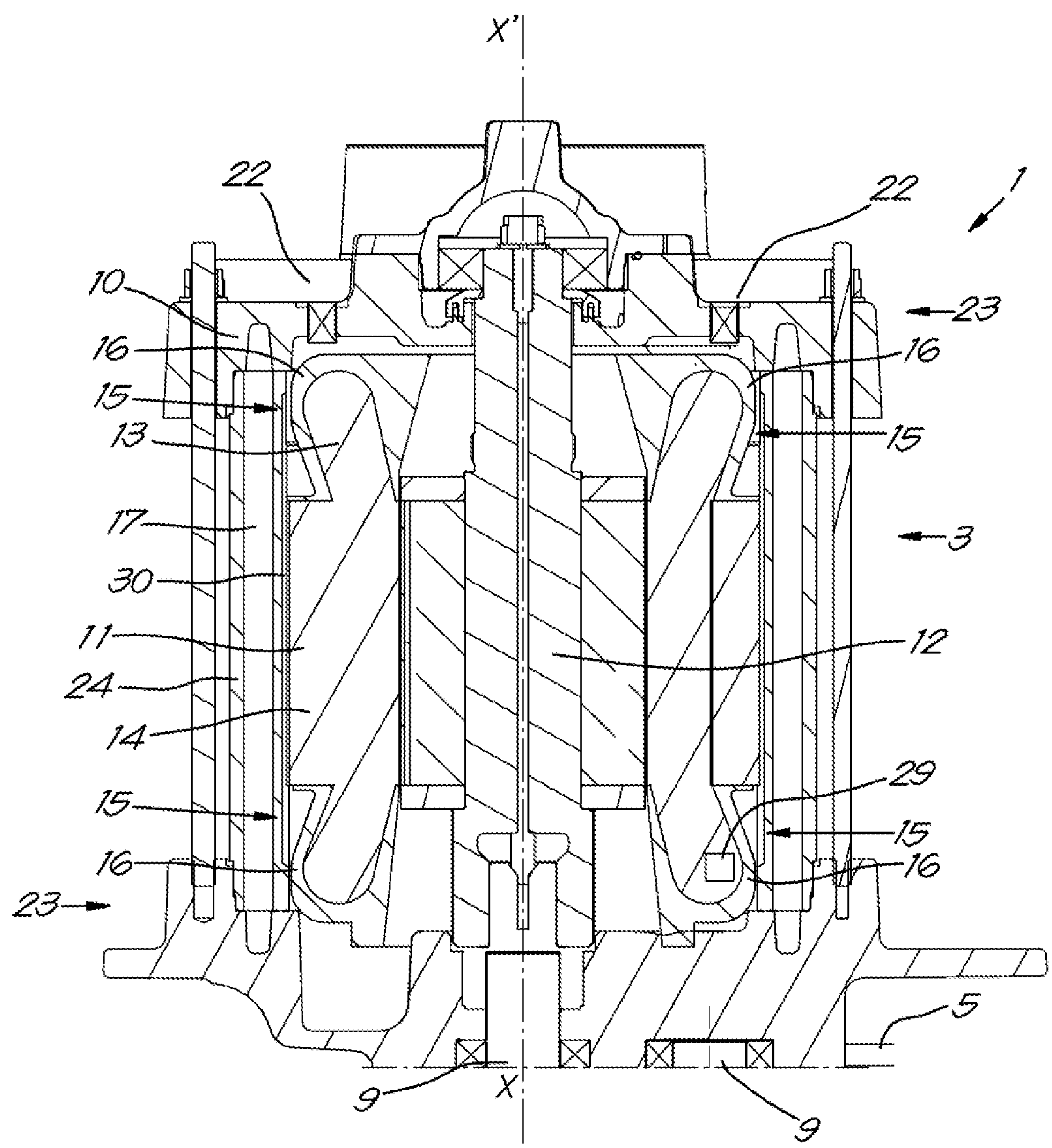
Figure 3:
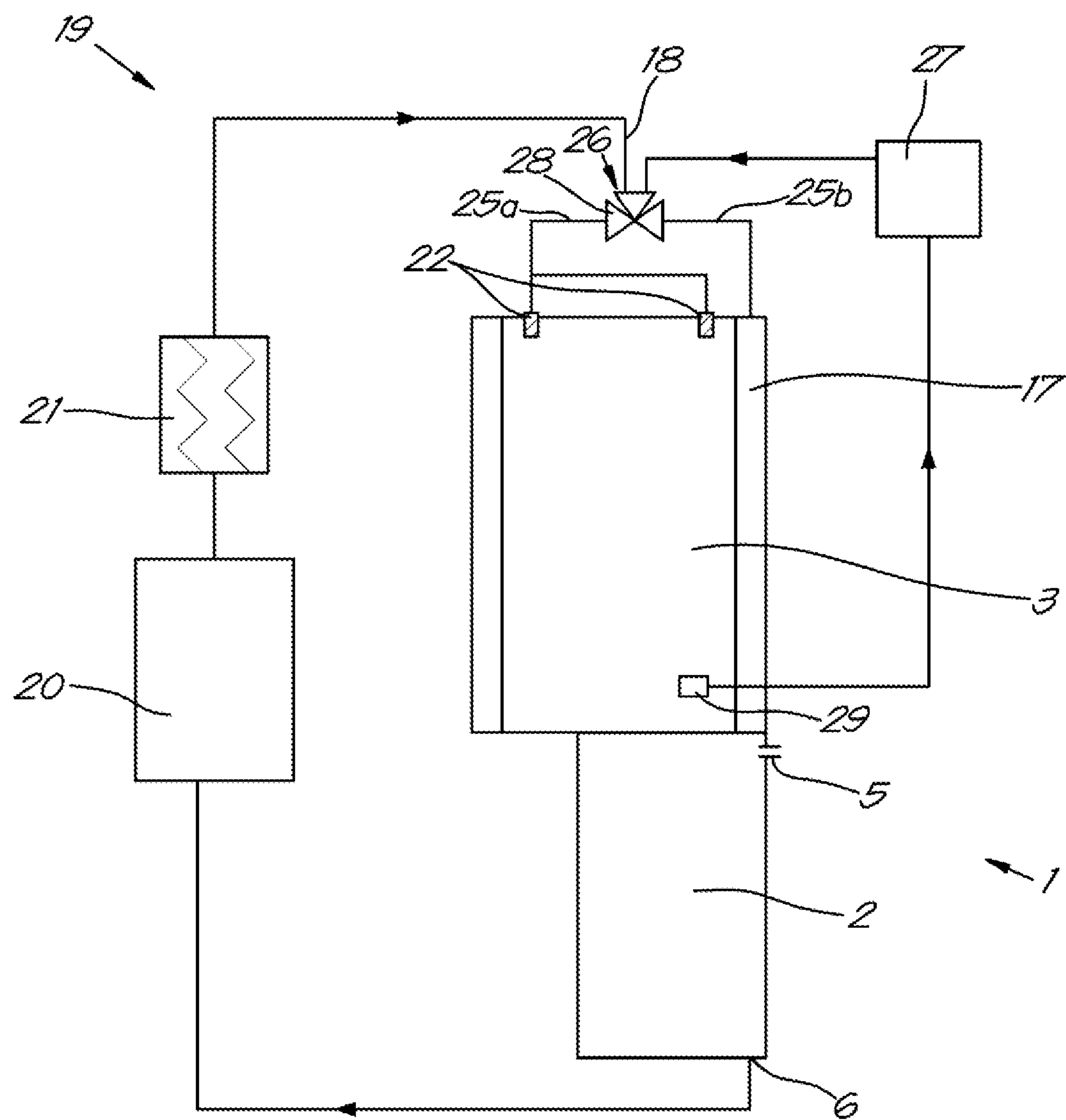

To better demonstrate the characteristics of the invention, the following describes, as an example without any restrictive character, some preferred embodiments of a compressor device according to the invention, with reference to the accompanying drawings, wherein:

FIG. 1 schematically shows a cross-section of a part of a compressor device as claimed in the invention;

FIG. 2 shows the magnet-assisted motor of FIG. 1 in more detail;

FIG. 3 schematically shows the part of the compressor device shown in FIG. 1, together with a related oil circuit.

FIG. 1 is a schematic representation of a compressor device 1 according to the invention.

Compressor device 1 comprised mainly a compressor element 2 and a magnet-assisted motor 3.

In this case, but not necessary for the invention, compressor element 2 is provided with a screw compressor element.

It comprises a compressor housing 4 with an inlet 5 for supplying a gas to be compressed and an outlet 6 for supplying compressed gas.

Said gas may for instance, but not necessary for the invention, be air.

Two collaborating screw rotors 7 are installed in the compressor housing 4, which can compress gas sucked in by rotation.

To this end, the screw rotors 7 with their shafts 8 are rotatably fitted in the compressor housing 4 by means of bearings 9.

One of the two screw rotors 7 is driven by said motor.

FIG. 2 shows the motor 3 in detail.

In this case, but not necessary for the invention, the magnet-assisted motor 3 is a permanent magnet motor 3.

The motor 3 comprises a motor housing 10 which incorporates a motor stator 11 and a motor rotor 12 which is rotatably provided in the motor stator 11.

The motor stator 11 is provided with windings 13, which are typically placed around a laminated core 14, also referred to as laminations.

According to the invention, the axial ends 15 of these windings 13, also called the 'heads' of the windings 12, are provided with a protective layer 16.

This means that these heads are provided with a layer which is applied on, over and around the windings 13.

This protective layer 16 is preferably thermally conductive, electrically insulating and water- and oil-resistant.

The protective layer 16 may an include an epoxy resin, for example, but a polymer material is another option.

It is not ruled out that instead of only the axial ends 15, the complete windings 13 or even the complete motor stator 11 have a protective layer 16.

For that purpose, the protective layer 16 will extend over the entire winding 13 or over the entire motor stator 11.

The protective layer 16 will typically be a thin layer of for instance 0.1 millimeter thick to one millimeter thick. Of course, it is not ruled out that, for example, the protective layer 16 is between one and five millimeters thick.

Alternatively, the protective layer 16 may be much thicker, with the axial ends 15 of the windings 13 encapsulated in a protective material. Obviously, the complete windings 13 or the complete motor stator 11 can also be encapsulated in a protective material.

In this case, the motor housing 10 also acts as a cooling jacket 17. It is not ruled out that the motor housing 10 is provided with a separate cooling jacket 17.

As shown in FIG. 1, the compressor device 1 is a vertical compressor device 1, with the motor rotor 12 of the magnet-assisted motor 3 extending along an axial direction X-X' which is vertically positioned in normal operation of the compressor device 1, while the magnet-assisted motor 3 forms a head or upper part of compressor device 1 and compressor element 2 forms a base or lower part of the compressor device 1.

In addition, according to the invention, an oil supply line 18 is also provided to inject oil into the magnet-assisted motor 3.

FIG. 3 shows this oil supply line 18. As can be seen, in this example, but not necessary for the invention, it is part of an oil circuit 19.

In this case, the oil circuit 19 is arranged to direct all oil first to the motor 3 and then to the compressor element 2.

From the compressor element 2, the oil circuit 19 flows back to motor 3 via oil reservoir 20 and oil cooler 21 to form a closed circuit for the oil.

Said oil supply line 18 is connected to one or more nozzles 22 which are directed at the heads 15 or axial ends 15 of the windings 13 of the motor stator 11 and the cooling jacket 17 of the motor 3.

These nozzles 22 will spray the oil directly onto the heads 15 of the windings 13 in the form of an oil stream or 'jet'.

It is not ruled out that the nozzles 22 will atomize the oil, that is, spray the oil on the heads 15 of the windings 13 in the form of small droplets.

In the example shown, the above nozzles 22 are located at the axial ends 23 of the motor stator 11 and the motor rotor 12, with the nozzles 22 directed axially.

A number of nozzles 22 may be provided, for example two to eight and preferably symmetrically located around the axis X-X' of the motor rotor 12.

In this case, nozzles 22 are located at the top, that is at the axial end 23 of the motor 3 facing away from compressor element 2, but it is not ruled out that additional or alternative nozzles 22 are located at the bottom, that is on the axial end 23 of the motor 3 directed at the compressor element 2.

It is also possible that the nozzles 22 are located on the side of the motor housing 10, that is at the location of the jacket 24 of the motor housing 10, with the nozzles 22 directed radially in this case, so that they are directed to the heads 15 of the windings 13.

In this situation too, nozzles 22 may be located at the top as well as at the bottom.

The exact location of the nozzles 22 will depend on the design of the motor 3 in general and on the motor housing 10 in particular.

If the motor housing 10 does not allow an oil supply to pass through the motor housing 10, an alternative solution is to design the motor rotor 12 at least partially hollow and to integrate a nozzle 22 in this hollow motor rotor 12.

Obviously, then the nozzle 22 is directed radially outward, while a radial passage in the motor rotor 12 is provided to allow oil to pass through.

As stated above, the oil supply line 18 is connected to the nozzles 22 and to the cooling jacket 17.

This means that oil that is guided through the oil supply line 18 to the motor 3 will enter both the nozzles 22 and the cooling jacket 17.

In the example shown, this is done in parallel, because the oil supply line 18 branches off into two branch lines 25*a*, 25*b*, as shown in FIG. 3.

A first branch line 25*a* connects the oil supply line 18 to said nozzles 22 and the second branch line 25*b* connects the oil supply line 18 to the cooling jacket 17.

In this case, the compressor device 1 is further equipped with means 26 to control the amount of oil flowing to the first and second branch lines 25*a*, 25*b* and to a controller 27 to control said control means 26.

This allows the amount of oil flowing to the nozzles 22 to be controlled, between no oil and all or nearly all of the oil.

If no control means 26 are provided, oil will be injected continuously through the nozzles 22.

In that case, said control means 26 are designed as a three-way valve 28, but may also be designed as one regular valve, installed in one of the two branch lines 25*a*, 25*b*.

In addition, in this example, the compressor device 1 has measuring means 29 to determine the temperature of the heads 15 or axial ends 15 of the windings 13 of the motor stator 11 and the controller 27 is provided with an algorithm to control the regulating means 26 based on the temperature of the heads or axial ends 15 of the windings 13 of the motor stator 11.

These measuring means 29 include, for example, a temperature sensor.

In addition, in the example shown, there are also axially oriented grooves 30 or channels installed in the motor housing 10 at the location of the motor stator 11.

Just like the nozzles 22, these grooves 30 may be situated symmetrically around the axis X-X' of the motor rotor 12.

Alternatively or additionally, it is also possible to provide the axially oriented grooves 30 or channels in the motor stator 11 itself.

The oil, which is injected through the nozzles 22, can flow out along these channels or grooves 30.

The oil may also flow out through the space between the motor rotor 12 and the motor stator 11 or through the laminations 14 of the motor stator 11.

The operation of compressor device 1 is very simple and as follows.

During the operation of compressor element 1, compressor element 2 will be driven by the magnet-assisted motor 3.

The screw rotors 7 will compress gas that is drawn in through their collaborating action.

During operation, oil will be injected into the compressor element 2 as well as into the motor 3.

The oil supply line 18 will first direct all oil to the motor 3.

The second branch line 25*b* will direct the oil to the cooling jacket 17.

This oil will be able to draw heat from the motor housing 10 in the known way to cool the motor 3.

Oil is also directed to the nozzles 22 through the oil supply line 18 and the first branch line 25*a*.

As aforementioned, the nozzles 22 are placed at an appropriate location that will allow them to atomize the oil at the actual ends 15 of the windings 13 of the motor stator 11.

The small oil droplets will be able to draw heat from these axial ends 15 of the windings 13, which will then be cooled more efficiently than with the oil flowing through the cooling jacket 17.

The protective layer 16 on the axial ends 15 of the windings 13 protects them from the oil being sprayed on them.

The controller 27 will control how much oil is directed to the nozzles 22 through the first branch line 25*a*.

For that purpose, the controller 27 is provided with an algorithm in this case to control the control means 26 based on the temperature of the windings 13 of the motor stator 11.

In this case, the aforementioned algorithm is such that the controller 27 will control the aforementioned control means 26 so that no oil will flow to the first branch line 25*a* when the temperature of the axial ends 15 of the windings 13, as measured by the measuring means 29, is lower than a predefined maximum temperature $T_{max}$.

In other words, only if the temperature of the heads 15 of windings 13 rises too high so that cooling is required, oil will be atomized onto them.

It is also not ruled out that the quantity of oil that is directed to the nozzles 22 through the first branch line 25*a*, is controlled on the basis of the measurements of the measuring means 29.

The atomized oil can then flow down via three paths, toward the other heads or axial ends 15 of the windings 13 in order to cool these axial ends 15 of the windings 13 as well.

These three paths are:

- between the motor housing 10 and the motor stator 11, via the aforementioned axially oriented grooves 30 or channels provided in the motor stator 11;
- between the motor rotor 12 and the motor stator 11;
- through laminations 14 of the motor stator 11.

The oil will also cool the motor stator 11 and possibly the motor rotor 12.

In this case, the oil will also flow by force of gravity through the motor 3 in the direction of compressor element 2.

However, even if it would not concern the vertical compressor element 1, the oil would still flow toward compressor element 2, by force of the oil pressure and/or vacuum created by compressor element 2.

When the oil has reached the bottom of motor 3, it will be routed through oil circuit 19 to compressor element 2, to be injected, for example, into compressor housing 4 or bearings 9.

The oil will leave the compressor device 1 via outlet 6 along with the compressed gas.

An oil separator will separate it and it will pass through the oil circuit 19 along the oil reservoir 20 and then enter the oil cooler 21 to be injected back into the motor 3 from there.

Although the above example shows and describes the oil supply to the nozzles 22 and the cooling jacket 17 in parallel, it is not ruled out that this is done in series.

This means that the oil supply to the nozzles 22 and the cooling jacket 17 can also be arranged in series, wherein the oil supply line 18 is directly connected to the aforementioned cooling jacket 17, so that all the oil first goes to the cooling jacket 17 and then to the nozzles 22.

In other words, no branch lines 25*a*, 25*b* are provided here.

In this case, channels are provided in the motor housing 10, which allow the oil, after being directed through the cooling jacket 17, to be directed to the nozzles 22 for injection into the motor 3.

Note that also in this case, the oil supply line 18 is connected to the nozzles 22, albeit not directly, but through the cooling jacket 17 and any further channels in the motor housing 10.

Such an approach has the advantage of not requiring any additional measures to regulate the oil supply.

The present invention is by no means limited to the embodiments described as examples and shown in the figures, but a compressor device according to the invention can be implemented in all shapes and sizes without going beyond the scope of the invention.

The invention claimed is:

1. A compressor device, comprising:

- a compressor element (2) with an inlet (5) for supplying gas and an outlet (6) for discharging compressed gas,
- a magnet-assisted motor (3) provided with a motor housing (10) in which a motor stator (11) is installed and a motor rotor (12) is rotatably installed in the motor stator (11), wherein the motor stator (11) is provided with windings (13) and wherein the motor housing (10) is provided with or acts as a cooling jacket (17); and
- an oil supply line (18) for injecting oil into the magnet-assisted motor (3);
- wherein the oil supply line (18) is connected with one or a plurality of several nozzles (22) directed at heads or axial ends (15) of the windings (13) of the motor stator (11) and with the cooling jacket (17) of the magnet-assisted motor (3) and wherein the heads or axial ends (15) of the windings (13) are covered with a protective layer (16),
- wherein the oil supply line (18) branches out into two branch lines (25*a*, 25*b*),
- wherein a first branch line (25*a*) connects the oil supply line (18) with said nozzle or said plurality of nozzles (22) and the second branch line (25*b*) connects the oil supply line (18) with the cooling jacket (17), and
- wherein the compressor device (1) is further provided with control means (26) for controlling the quantity of oil going to the first and second branch lines (25*a*, 25*b*) and a controller (27) which will control said means (26).

2. The compressor device according to claim 1, wherein the protective layer (16) is thermally conductive, electrically insulating and resistant to water and oil.

3. The compressor device according to claim 2, wherein the protective layer comprises an epoxy resin.

4. The compressor device according to claim 1, wherein there are a plurality of nozzles and the plurality of nozzles (22) are located at one or more of the following locations in the motor housing (10):

at axial ends (23) of the motor stator (11) and the motor rotor (12), wherein the nozzles (22) are directed axially, at a side, through a wall (24) of the cooling jacket (17) of the motor housing (10), wherein the nozzles (22) are directed radially.

5. The compressor device according to claim 1, wherein the compressor device (1) is further provided with measuring means (29) to determine the temperature of the heads or axial ends (15) of the windings (13) of the motor stator (11) and the controller (27) is provided with an algorithm for controlling the control means (26) on the basis of the temperature of the heads or axial ends (15) of the windings (13) of the motor stator (11).

6. The compressor device according to claim 5, wherein said algorithm is such that the controller (27) will control said control means (26) in such a way that no oil will flow to the first branch line (25*a*) when the temperature of the heads or axial ends (15) of the windings (13) is lower than a preset maximum temperature $T_{ax}$.

7. The compressor device according to claim 1, wherein the protective layer (16) extends over an entirety of the windings or over an entirety of the motor stator (11).

8. The compressor device according to claim 1, wherein at least the heads or axial ends (15) of the windings (13) are encapsulated in the protective layer.

9. The compressor device according to claim 1, wherein the oil supply line (18) is part of an oil circuit (19) which is also part of the compressor device (1), wherein the oil circuit (19) is designed in such a manner that all the oil is first directed to the magnet-assisted motor (3) and then to compressor element (2).

10. The compressor device according to claim 1, wherein the motor stator (11) is provided with axially oriented grooves (30) or channels and/or wherein the motor housing (10), at the location of the motor stator (11), is provided with axially oriented grooves (30) or channels.

11. The compressor device according to claim 1, wherein the nozzle or the plurality of nozzles (22) atomize the oil.

12. The compressor device according to claim 1, wherein the magnet-assisted motor (3) is a permanent magnet motor (3).

13. The compressor device according to claim 1, wherein the compressor element (2) is a screw compressor element (2).

14. The compressor device according to claim 1, wherein the compressor device (1) is a vertical compressor device (1), wherein the motor rotor (12) of the magnet-assisted motor (3) extends in an axial direction (X-X') vertically positioned in normal compressor device operation (1), wherein the magnet-assisted motor (3) forms a head or upper part of the compressor device (1) and the compressor element (2) forms a base or lower part of the compressor device (1).

* * * * *